Figure 4:
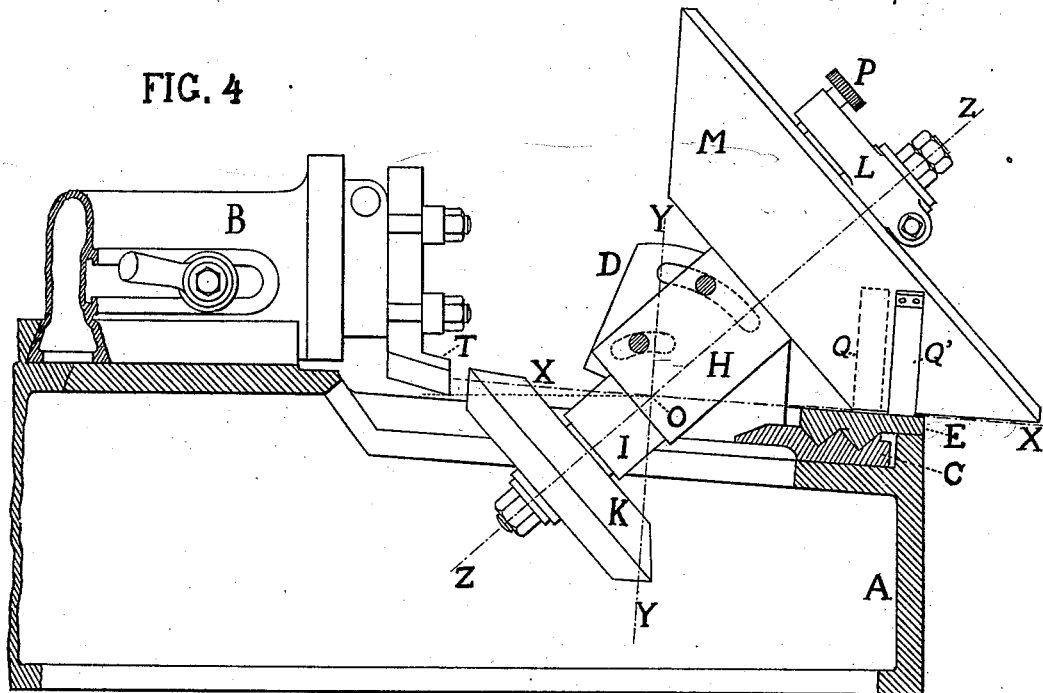

(Model.)
H. BILGRAM.
BEVEL GEAR CUTTER.
No. 294,844.    Patented Mar. 11, 1884.
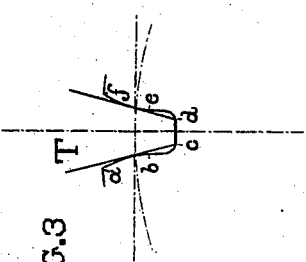
FIG.3
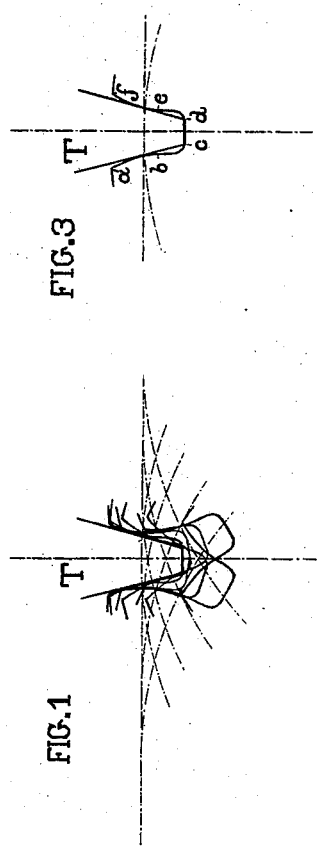
FIG.2
FIG.1
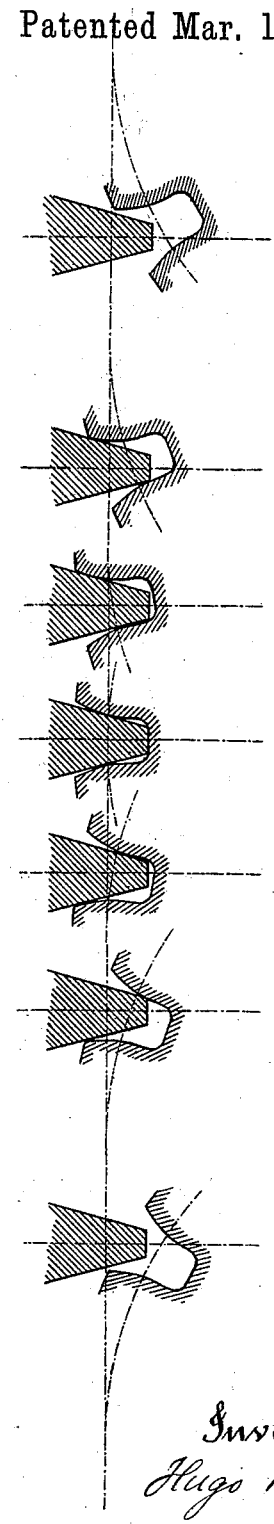
Witnesses.
Geo. L. Pfouts
Fred. G. Jahn
Inventor.
Hugo Bilgram (Model.)

3 Sheets—Sheet 2.

H. BILGRAM.
BEVEL GEAR CUTTER.

No. 294,844. Patented Mar. 11, 1884.

Witnesses.
Geo. L. Pfouts
Fred. G. Jahn

Inventor.
Hugo Bilgram (Model.)
3 Sheets—Sheet 3.
H. BILGRAM.
BEVEL GEAR CUTTER.
No. 294,844. Patented Mar. 11, 1884.
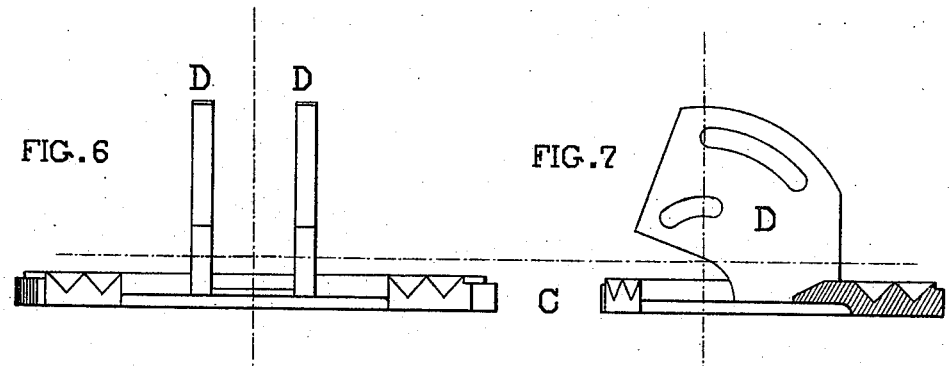
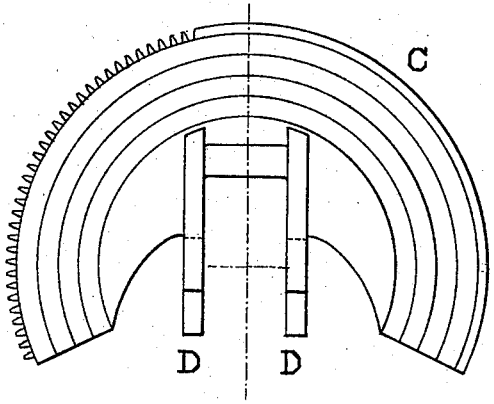
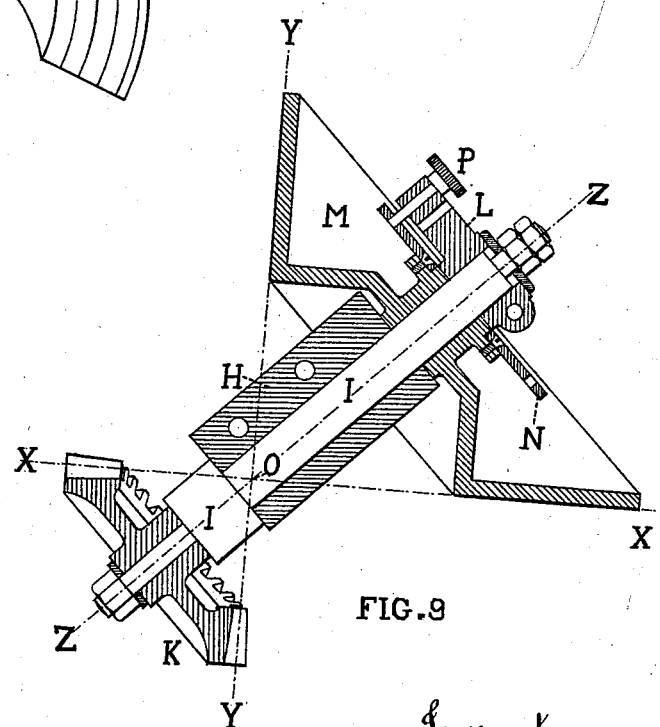
Witnesses
Geo. D. Houts.
Fred. G. Jahn
Inventor.
Hugo Bilgram

UNITED STATES PATENT OFFICE.

HUGO BILGRAM, OF PHILADELPHIA, PENNSYLVANIA.

BEVEL-GEAR CUTTER.

SPECIFICATION forming part of Letters Patent No. 294,844, dated March 11, 1884.

Application filed December 6, 1882. (Model.)

*To all whom it may concern:*

Be it known that I, HUGO BILGRAM, of the city and county of Philadelphia, and the State of Pennsylvania, have invented a new and useful Improvement in Machines for Cutting the Teeth of Bevel-Wheels, of which the following is a specification.

For cutting the teeth of bevel-wheels two distinct principles have been employed heretofore—*i. e.*, first, a tool is used, either reciprocating or rotary, or both, the outline of which has a curved shape, conforming with the shape the teeth are desired to obtain. This tool is generally fed in two directions through the spaces between the teeth to produce the wedge-shaped or convergent form which these spaces are required to have. However, as the curve of the teeth in bevel-wheels, when correctly formed, changes constantly from one end of the tooth to the other, bevel-wheels produced in this way are not theoretically correct, and, although the cutter is usually shaped so as to make the correct form at about the middle of the face of the wheel, the sides of the teeth need some filing if a tolerably well gearing bevel-wheel is desired. The second principle employed in cutting the teeth of bevel-wheels partially overcomes this defect. It consists in the use of a pointed reciprocating tool, the motion of the cutting-point of which is invariably directed toward the apex of the bevel-wheel, and which is capable of receiving a lateral motion, swinging on that apex. This lateral motion is guided and directed by a guide or templet made of a shape corresponding with the desired form of the teeth of the bevel-wheel. A separate templet is necessary for every varying shape of teeth, and the correctness of the work depends upon the accuracy with which this templet is made and adjusted. In order to produce correct teeth by this mode, the cutting-point of the tool should be a mathematical point—*i. e.*, the sharp point of an angular tool; but, as such a tool would produce a very rough surface, the point of the tool employed must be more or less rounded at the expense of the accuracy of the resulting work, and notwithstanding this sacrifice the surface produced will be made up of a series of shallow rounded grooves, which are at right angles to the motion of the gearing-cogs and induce a grating noise when running.

In my invention I employ a principle substantially differing from either of those indicated above—*i. e.*, the principle of evolution—and thus produce a theoretically correct tooth without the aid of any templet.

It is known that any number of gear-wheels which do correctly gear with a rack having teeth of the shape of a truncated wedge will also correctly gear with one another, and by employing a reciprocating tool of the shape of such a tooth, and rolling under it a gear-wheel on its pitch-line, the reciprocating tool will cut the teeth to such a shape that they will correctly gear with any other wheel of the same pitch, the teeth of which are cut in the same manner and with the same tool. In explanation of this theory, I show in Fig. 1 a portion of a wheel rolling on its pitch-line under the tool T, the latter having the shape of a truncated wedge. A series of these positions are shown in Fig. 2 separated. The outline of the space, when formed as above described by the tool T, consists of five separate portions, *ab*, *bc*, *cd*, *de*, and *ef*. (See Fig. 3.) The curves *ab* and *ef* are involutes evolved from a circle smaller than the pitch-circle, whose diameter depends upon the angle of the wedge-shaped tool. They are those parts of the teeth which come in working contact with the teeth of mating wheels. An inspection of Fig. 2 will show that those parts of the space are produced by the flat sides of the wedge-shaped tool T. The portions *bc* and *de* are prolate involutes, and are commonly called "clearance-curves," as these parts of the teeth never come in contact with the mating wheel, but merely make room for a free passage of the points of the teeth of the mating wheel. These curves are produced by the corner-points of the tool T. The portion *cd* is the bottom of the space, and is formed by the front edge of the tool. In applying this principle to the formation of the teeth of bevel-wheels, in which the spaces between the teeth have not a uniform width, only one of the sides of each space can be cut at one time, and the tool must be so narrow that it can pass through the narrowest part of the space. Each side of the teeth must thus be formed by a separate evolution. At the same time the rolling of the bevel-wheel blank must be that of its pitch-cone rolling on a plane, and as the natural motion of a cone rolling on a plane surface consists in, first, a motion of its axis tracing a conical surface—*i. e*, a motion resembling that of a conical pendulum—and, second, in a rotation on this axis, a machine for the said purpose must embody these two movements in its construction.

Having given a general outline of the principle on which my invention is based, I now proceed to describe the machine for cutting the teeth of bevel-wheels.

Figure 5:
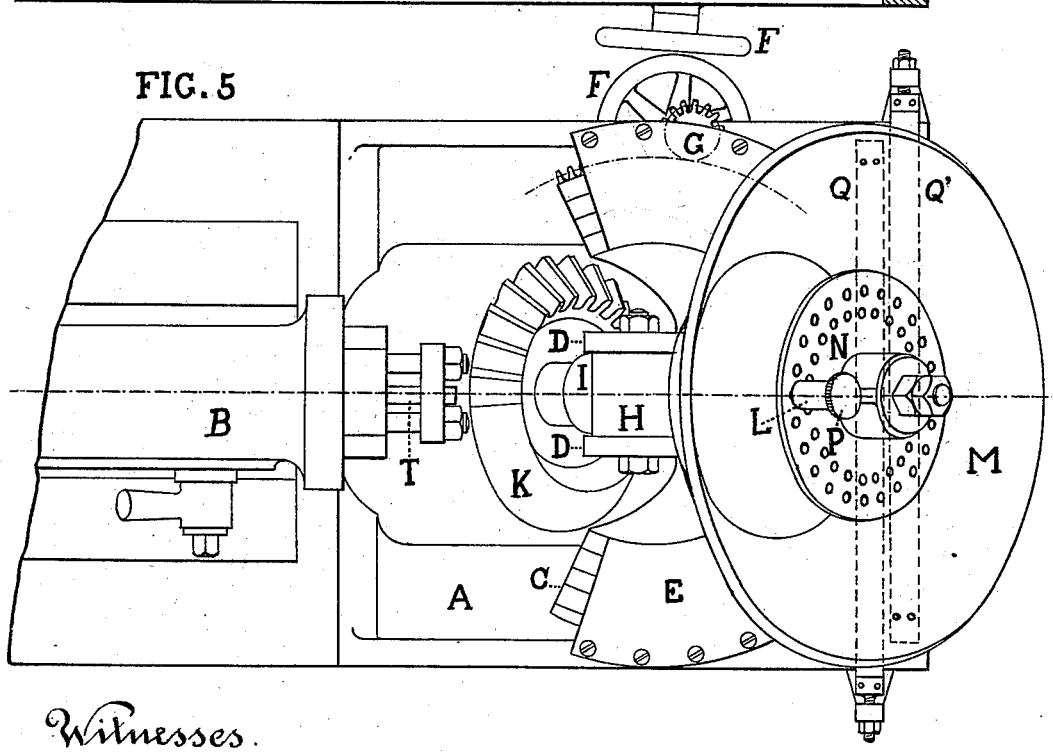

In Figs. 4 and 5, A is the bed or frame of the machine, and B the reciprocating slide or head of a shaping-machine carrying the tool T. C is a plate, with circular grooves, carrying two uprights, D D, and is shown detached in Figs. 6, 7, and 8. It is held in position on the machine by means of the grooved ring E, which is securely screwed to the bed, and which permits the plate C to rotate on its geometrical axis Y Y. This rotation is accomplished through the hand-wheel F and the pinion G, gearing into the toothed rim of the plate C. Between the two uprights D D of the plate C is held by bolts a block, H, (see Figs. 4, 5, and 9,) forming the bearing for the arbor I. This bearing H can be secured to the plate C at any desirable angle. The arbor I carries the blank K of the wheel to be cut on one side of its bearing H. On the other side it carries the former-cone M, which is free to turn on it, and the lever L, which is firmly secured by means of a clamp-screw. Firmly fastened to the former-cone M is the index-plate N, on which there are two rows of holes, each row being divided in as many divisions as the bevel-wheel K is to have teeth. By the pin P, which is carried by the lever L and enters into the division-holes of the index-plate N, the former-cone M can be coupled to the arbor I. The former-cone M is made of an angle corresponding with the angle of the conical pitch of the bevel-wheel K, and the block H is so located between the uprights D D that the axis Z Z of the arbor I intersects the geometrical axis Y Y of the plate C in the plane X X, to which plane the former-cone M must be tangential. The point O of intersection is the geometrical center of the machine. Two bands, Q and Q', of steel or other suitable material, of each of which one end is secured to the frame of the machine, while the other is fastened to the former-cone M, hold the latter confined, so that it can assume only a rolling motion, but cannot slip on the plane X X when its axis is moved. The plane X X forms an angle with the line of motion of the tool T equal to that angle which is formed by the bottom surface of the spaces of the bevel-wheel K with its conical pitch.

The operation of the machine is as follows: The blank K of the wheel to be cut is firmly fastened to the arbor, so that its apex coincides with the point O, and the tool T is so adjusted that one of its front corners is directed in a straight line toward the center O of the machine. The plate C is moved so far to one side that the tool T will clear the blank K and the machine is set in motion. By a slow feeding motion on the hand-wheel F the plate C is slowly rotated on its axis Y Y. This motion causes the axis Z Z of the arbor I to trace a conical surface, and the former-cone M is forced to assume a rolling motion on the plane X X, slipping being prevented by the two bands Q and Q'. The blank K will participate in this rolling motion, assuming successively positions in relation to the tool T similar to those indicated in Fig. 2, and the tool will produce a space of which one side has the correct form for bevel-gearing. When the feeding has been continued so far that the tool has made its exit from the space, the plate C is moved back to its original position by the hand-wheel F, and the pin P withdrawn from the index-plate N and entered into the adjoining hole after a partial rotation of the arbor I. The operation of rolling the blank K is then repeated as before and continued until all teeth of the bevel-wheel K are finished to this stage. Then the tool is readjusted so that the other corner-point moves in a straight line toward the center O of the machine, and the pin P is adjusted to the second row of holes of the index-plate N. This second row of holes is so located in relation to the first row that the teeth of the bevel-wheel will obtain the proper thickness. The operation above described is then repeated for the second side of the teeth and the bevel-wheel is completed.

If the machine is required to do a variety of work, it will be necessary to make the angle adjustable, by which the plane X X is inclined to the line of motion of the tool T.

I claim—

1. As an improvement in bevel-gear-cutting machines, a straight-edged, truncated, V-shaped tool, adapted to cut with its straight sides the curved working-faces of the teeth of the bevel-wheel through evolution, substantially as described.

2. In bevel-gear-cutting machines, the arbor I, carrying the blank K, the bearing H of said arbor being secured in an inclined position to the plate C, which is made to revolve on its geometrical axis Y Y, and by its revolution transmits to the center line of the arbor I a motion tracing a conical surface, substantially as described.

3. In bevel-gear-cutting machines, the former-cone M, fitted to the inclined arbor I, in combination with the bands Q and Q', whereby said cone describes a rolling motion when said arbor makes the aforesaid conical movement, substantially as described.

4. In bevel-gear-cutting machines, the combination, with the index-plate N, lever L, and pin P, of the former-cone M and the arbor I, whereby said former-cone can be coupled to the arbor I in various positions in order that the rolling motion of the cone may be transmitted to said arbor.

5. In bevel-gear-cutting machines, the combination of the reciprocating tool T and its holder B with the rotating plate C, inclined bearing H, arbor I, former-cone M, with bands Q and Q', index-plate N, lever L, and pin P, substantially as and for the purpose described.

HUGO BILGRAM.

Witnesses:
GEO. L. PFOUTS,
FRED. G. JAHN.